United States Patent [19]

Levitt et al.

[11] 4,103,137
[45] Jul. 25, 1978

[54] CUTTING OF MATERIALS BY SPARK EROSION

[76] Inventors: Charlie Maurice Levitt, 208 Sunvalley Lodge, Johannesburg; Samuel Chatterley, 1 Riethaan St., Florida Lake; Peter John Livsey Flinn, 115, St. Audley Rd., Transvaal, all of South Africa

[21] Appl. No.: 718,472

[22] Filed: Aug. 30, 1976

[30] Foreign Application Priority Data

Sep. 4, 1975 [ZA] South Africa .................. 75/5666
Mar. 22, 1976 [ZA] South Africa .................. 76/1744

[51] Int. Cl.² .................................................. B23P 1/08
[52] U.S. Cl. .................................. 219/69 W; 125/30 R; 219/69 M
[58] Field of Search ............... 219/69 M, 69 W, 69 R, 219/68, 383, 384, 69 E; 125/30 R; 204/164; 315/227 A

[56] References Cited

U.S. PATENT DOCUMENTS

| | | | |
|---|---|---|---|
| 2,552,582 | 5/1951 | Peteus et al. | 219/69 M |
| 2,635,487 | 4/1953 | Potter et al. | 219/69 M |
| 2,939,941 | 6/1960 | Heerschap et al. | 219/69 M |
| 4,013,863 | 3/1977 | Van Osenbrugger et al. | 219/69 M |

FOREIGN PATENT DOCUMENTS 28,639   2/1966   Japan .................. 219/69 M

*Primary Examiner*—Bruce A. Reynolds
*Attorney, Agent, or Firm*—Cushman, Darby & Cushman

[57] ABSTRACT

A method of cutting a material, which may be insulating or conducting, which includes the steps of placing a pair of parallel spaced electrodes, preferably taking the form of a pair of wires, close to or in contact with the material, applying a voltage across the electrodes and causing relative movement between the electrodes and the material as the spark erodes the material to effect the cut. The invention also provides apparatus for carrying out this method.

19 Claims, 2 Drawing Figures

CUTTING OF MATERIALS BY SPARK EROSION

BACKGROUND AND SUMMARY OF THE INVENTION

This invention relates to the cutting of materials using spark erosion techniques.

In prior art spark erosion cutting of conducting materials, one or more cutting elements, all at a high positive or negative voltage with respect to the material being machined (which is sometimes earthed) are used such that sparks are generated between the cutting elements and the material. The spark causes degradation of the material, which erodes in a controlled manner, thus resulting in the desired cutting.

However, the above method of cutting cannot be used for insulating materials without first providing a conductive path between the region of the cut and the external circuit. In the case of diamond, it is necessary first to carbonize the surface of the diamond, so that a conducting path between the cutting element at high voltage and earth is present. Sparking between the cutting element and the diamond can then take place since it has been found that, on spark erosion, a layer of carbon is formed over the spark eroded regions, thus maintaining the conducting path. In the case of those insulators, for which no such conducting layer is formed during spark erosion or provided by other means, the prior art techniques will not cut the insulating material.

According to the invention, a method of cutting a material includes the steps of placing a pair of parallel spaced electrodes close to or in contact with the material applying a voltage across the electrodes to produce a spark between the electrodes, and causing relative movement between the electrodes and material as the spark erodes the material to effect the cut. Preferably the erosion takes place in a suitable dielectric medium. To effect cutting movement of the electrodes through the material in the direction of cut must take place as the material is eroded. This movement may be achieved by moving the electrodes or the material or both.

The electrodes may be provided by the edges of a pair of parallel plates, which edges are preferably sharpened. Sharpened edges have the advantage that the spark will preferentially be produced at these edges. The plates may be of any suitable configuration. For example, the plates may be rectangular or they may be cylindrical, the one cylinder being inside the other. The electrodes may also be point electrodes.

In a preferred form of the invention, the electrodes are provided by a pair of parallel wires. The wires may lie in the same plane as the direction of relative movement of electrodes and material during cutting. Alternatively, the wires may lie in a plane which is perpendicular or at any other angle to this direction of movement.

The cross-sectional dimensions of the electrodes and the gap between the electrodes will vary according to the nature of the material being cut and the size of cut desired. For example, in the case of small objects such as diamonds the electrodes will be thin and the gap between them will be small. However, in the case of massive objects such as a block of metal or concrete, narrow cuts will generally not be required with a result that both the electrodes could be thick and the gap between the electrodes could be relatively large. Clearly the gap should not be so large that sparking is inhibited.

The voltage which is applied across the electrodes must be such as to produce a spark. The voltage applied will generally be between 500 and 20,000 volts. The rate of erosion and hence the cutting speed is dependent on the power dissipated by the spark. The power can be varied by adjusting the energy of the voltage pulse and the frequency of the pulse. However faster degradation leads to poorer surface finish. The parameters may be selected to achieve a desired surface finish.

As is mentioned above, the spark which is generated between the electrodes causes erosion for degradation of the material. As the material is removed, the electrodes and the workpiece are moved closer to each other, as discussed above, and the desired cut is produced. The electrodes may be moved through the material in the direction of cut by applying a load to the electrodes. The load forces the electrodes through the material as erosion takes place. The load which will be applied to the electrodes will vary according to parameters such as frictional force and mechanical tensioning of the electrodes. By way of example, it has been found that for wires and diamond, a load of between 1 to 50 grams applied to the wires produces a satisfactory cut. Alternatively, the electrodes may be kept sationary and the workpiece moved across the stationary electrodes by use of a suitable servo-mechanism as described fully in Electro-Erosion Machining of Metals by Livshits A. L., Butterworths, London 1960.

The method of the invention has particular application to the cutting of insulating materials due to the fact that it is not necessary by this method to form a conducting layer on the material. Examples of insulating materials which can be cut by the method of the invention are diamond, cubic boron nitride and ceramics such as aluminium oxide, spinel and porcelain. The invention also finds application with conducting materials such as tungsten carbide, cemented tungsten carbide, steels and other metals, diamond and cubic boron nitride compacts and semi-conductors such as silicon and germanium.

During cutting the workpiece is electrically floating and assumes a potential which depends on the particular operating conditions.

The spark erosion of the material may take place in a suitable dielectric liquid which serves to confine the spark to the cutting zone while at the same time acting as a coolant and a flushing agent for clearing particles detached from electrodes and the workpiece. Suitable dielectrics are liquids such as petroleum, kerosene, tetrachloromethane, trichloroethylene, tetraline, olive oil and paraffin oil. Generally these are liquids with high flash point which are non-conducting until the field breakdown strength is exceeded and which then deionize rapidly. A stream of the liquid can be poured over the zone in which sparking takes place. Alternatively, this zone may be immersed in a bath of the liquid.

In one particular example of the invention, the method utilises a pair of spaced parallel wires to cut diamond. The shape of the wires is not critical although for convenience the wires will generally have a circular cross-section. The wire thickness will in general be in the range 0.01 mm to 0.1 mm and the gap between the wires will generally not exceed 2 mm. The gap preferably lies in the range 0.025 to 2mm.

According to another aspect of the invention, there is provided apparatus for carrying out the above method including a pair of spaced parallel electrodes adapted to be placed close to or in contact with the material, means to apply a voltage across the electrodes to produce a spark in a zone between the electrodes, and means to move the electrodes and the material relatively to each other as the spark erodes the material to effect the cut. Each electrode preferably comprises a wire. Where the electrodes are provided by wires it is preferable to provide a feed roller and a take-up roller for the wires; the rollers being adapted continuously to feed wire through the spark zone. Furthermore, the apparatus may include means to vary the spacing between the wires in the spark zone. These means may comprise two spaced prongs, each prong straddling the wires and being rotatable about an axis which is transverse to the plane of the wires.

DETAILED DESCRIPTION OF THE INVENTION

Figure 1:
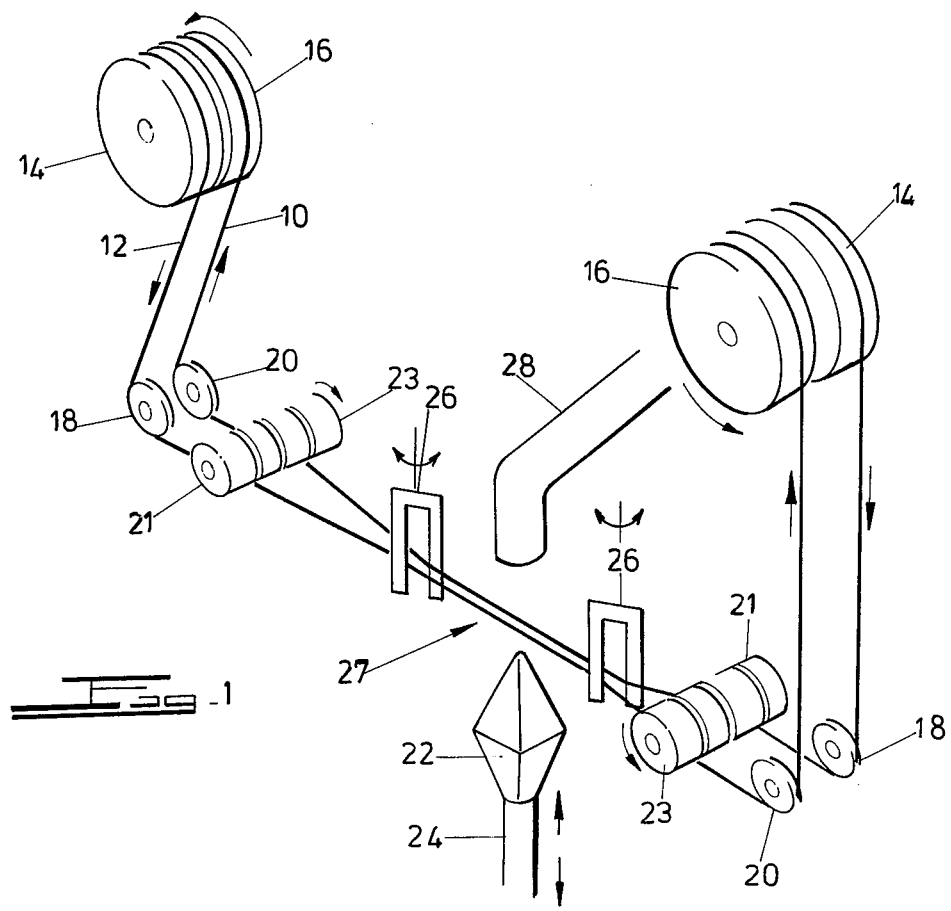
FIG. 1 of the attached drawings illustrates diagrammatically a perspective view of an embodiment of apparatus for carrying out the method of the invention, the dimensioning of the component parts and their representations not being exact in FIG. 1, but merely being schematic.

Referring to the drawing, the apparatus comprises a pair of wires 10, 12 which are insulated from each other. Each wire runs from a tensioned feed roller 14 to a take up roller 16 and passes over two guides 18 and 20 and around capstans 21, 23. The capstan 23 which is closer to the take up roller is a drive capstan while the capstan 21 is merely a guide. The capstans 23 and the take up rollers 16 are arranged to rotate so that the wires move past each other in opposite directions. This ensures that the wires are not fused to each other when a voltage is applied across them. The respective roller, guides and capstans of each wire are insulated from each other.

A diamond workpiece 22 is mounted on a pedestal 24 which is adapted to be moved up and down as indicated by the arrows. The pedestal may be adapted to be moved in this manner by being connected to a standard servo-mechanism as described for example in the Livshits reference mentioned above in chapter 3. The servo-mechanism maintains a suitable constant distance between each wire and the workpiece and in this way movement of the wires through the workpiece, and hence cutting is effected as erosion takes place. Alternatively, force may be applied to the wires 10, 12 to move them in a direction of cut by any suitable conventional means for effecting unidirectional movement of two wires.

The wires pass through prongs 26 made of suitable insulating material. The gap between the wires can be varied by varying the angle of the prongs to the wires, i.e. the prongs are rotatable about an axis transverse to the plane of the wires. In this manner the gap between the wires in the zone 27 between the prongs can be made narrower than the gap outside of the prongs to restrict the sparking to the zone 27.

Figure 2:
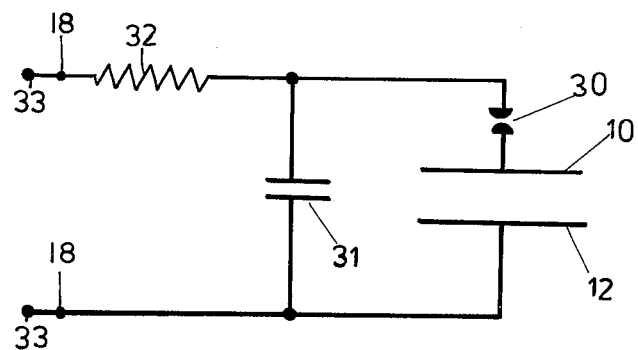
FIG. 2 is a schematic circuit diagram for providing sparking across the electrodes.

A suitable voltage is applied across the wires by applying a voltage across one of the sets of guides, 18, 18, or 20, 20. A circuit suitable for generating the sparking voltage is illustrated in FIG. 2. The wires 10 and 12 are connected in series with an adjustable air gap 30. The wires 10, 12 may be maintained in the same plane — or in a transverse plane — as the direction of cutting by any suitable conventional means. The width of the gap may be adjusted from 0.25 mm to 3.5 mm. A capacitor 31 of capacity of the order of nanofarads is connected in parallel to the air gap 30 and the wires. A limiting resistance 32 of about 50,000 ohms is connected in series with the capacitor 31 and the circuit is supplied with power by means of a suitable variable high voltage d.c. source connected to terminals 33. The voltage is adjustable from about 500 to 20,000 volts.

In use, the take-up rollers and capstans are rotated so that the wire from each feed roller passes between the two sets of guides and on to its take-up roller. The prongs are set at an angle to the wires so that the gap between the wires in the zone 27 between the prongs is narrower than the gap between the wires outside of this zone. A spark-producing voltage is applied across one of the sets of guides, the voltage being selected such that the spark is generated between the wires in the zone 27. The wires during sparking erode and could break. To prevent this the wires are not kept stationary and use is made of the continuous feed system described above, which comprise means for effecting relative movement between the edges of the wires 10, 12 and the material 22 in a direction different from the direction of cut to prevent breaking of the wires 10, 12 during cutting. The wires are wound around the drive capstans 23 in their passage between the two sets of guides to ensure that the wires move at a uniform speed through the sparking zone.

The diamond workpiece is moved to a position adjacent the wires in the sparking zone so that the spark erodes the diamond, the term "adjacent" as used in the specification and claims meaning close to or in contact with. A continuous flow of dielectric liquid is poured over the sparking and eroding zone through pipe 28. As erosion takes place, so the diamond moves upwards. In this manner the wires pass through the diamond and the diamond is cut.

An example of the invention in which a load was applied to the wires (as opposed to the use of a servo-mechanism described above) will now be described. Two parallel wires, 0.05 mm in thickness, were separated by 0.25 mm. The wires were placed close to a diamond workpiece and the diamond and the wires were immersed in a dielectric liquid paraffin. A potential of approximately 4000 volts was applied across the two wires. A force of 10 grams in the direction of the cut was applied to the wires, and the resulting cutting rate of the wires through the diamond was approximately 1 mm$^3$/hour. The resulting cut was a very clean one. While the invention has been shown and described herein in what is presently conceived to be the most practical and preferred embodiment thereof, it will be apparent to those of ordinary skill in the art that many modifications may be made thereof within the scope of the invention, which scope is to be afforded the broadest interpretation of the appended claims so as to encompass all equivalent methods and apparatus.

We claim:

1. A method of cutting a material in a given direction of cut utilizing a pair of spaced electrodes presenting generally parallel, elongate and spaced edges, including the steps of placing the electrode edges adjacent the material, applying a voltage across the electrodes to produce a spark between the edges, and effecting relative movement between the edges and the material in the direction of cut to effect cutting.

2. A method according to claim 1 wherein each electrode consists of a wire.

3. A method according to claim 2 wherein the wires lie in the same plane as the direction of the relative movement.

4. A method according to claim 2 wherein the wires lie in a plane which is transverse to the direction of the relative movement.

5. A method according to claim 2 wherein the material is an insulating material.

6. A method according to claim 1 wherein the material is an insulating material.

7. A method according to claim 1 wherein the voltage applied across the wires is in the range 500 volts to 20,000 volts.

8. A method according to claim 1 wherein the relative movement is effected by keeping the material stationary and moving the edges through the material in the direction of cut by applying a load to the electrodes.

9. A method according to claim 1 wherein the step of effecting relative movement in the direction of cut is effected by moving the material towards the edges in the direction of cut.

10. A method as recited in claim 1 comprising the further step of effecting relative movement between the edges and the material in a direction different from the direction of cut to prevent breaking of the wires during cutting.

11. A method of cutting a material in a given direction of cut utilizing a pair of spaced wires, including the steps of placing the wires adjacent the material, applying a voltage in the range of 500 to 20,000 volts across the wires to produce a spark thereacross, and effecting relative movement between the wires and the material in the direction of cut so that the spark continuously erodes the material in the direction of cut to effect cutting.

12. A method according to claim 11 wherein the material is diamond.

13. Apparatus for cutting a material in a given direction comprising a pair of spaced electrodes presenting generally parallel, elongate and spaced edges, adapted to be placed adjacent the material, means for applying a voltage across the electrodes to produce a spark in a zone between the edges, and means for effecting relative movement between the electrode edges and the material in the direction of cut so that the spark erodes the material to effect the cut in the direction of cut.

14. Apparatus as recited in claim 13 further comprising means for effecting relative movement between the edges and the material in a direction different from the direction of cut so that breakage of the wires during cutting is prevented.

15. Apparatus according to claim 14 in which each electrode consists of a wire.

16. Apparatus according to claim 15 wherein said means for effecting relative movement between the edges and the material in a direction different from the direction of cut comprise a feed roller and a take-up roller for each wire, and means for continuously feeding wire through the spark zone.

17. Apparatus according to claim 16 in which the wires are fed in opposite directions through the spark zone.

18. Apparatus according to claim 15 which includes means to vary the spacing between the wires in the spark zone.

19. Apparatus according to claim 18 in which the spacing varying means comprise two spaced prongs, each prong straddling the wires and being rotatable about an axis which is transverse to the plane of the wires.

* * * * *